US010473881B2

United States Patent
Kanzaki

(10) Patent No.: US 10,473,881 B2
(45) Date of Patent: Nov. 12, 2019

(54) LENS UNIT

(71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/304,694

(22) PCT Filed: Feb. 14, 2018

(86) PCT No.: PCT/JP2018/005011
§ 371 (c)(1),
(2) Date: Nov. 27, 2018

(87) PCT Pub. No.: WO2018/151130
PCT Pub. Date: Aug. 23, 2018

(65) Prior Publication Data
US 2019/0278048 A1    Sep. 12, 2019

(30) Foreign Application Priority Data

Feb. 15, 2017   (JP) ................................ 2017-026193

(51) Int. Cl.
*G02B 7/02* (2006.01)
*G02B 13/18* (2006.01)

(52) U.S. Cl.
CPC ............. *G02B 7/028* (2013.01); *G02B 7/021* (2013.01); *G02B 13/18* (2013.01)

(58) Field of Classification Search
CPC ......... G02B 7/028; G02B 7/021; G02B 13/18
See application file for complete search history.

(56) References Cited

U.S. PATENT DOCUMENTS

2013/0002938 A1*  1/2013  Kim .................. G02B 9/04
                                                       348/360

FOREIGN PATENT DOCUMENTS

| JP | 2008076628 | 4/2008 |
| JP | 2009053528 | 3/2009 |
| JP | 2009104100 | 5/2009 |

(Continued)

OTHER PUBLICATIONS

"International Search Report (Form PCT/ISA/210)" of PCT/JP2018/005011, dated May 22, 2018, with English translation thereof, pp. 1-4.

*Primary Examiner* — Joseph P Martinez
(74) *Attorney, Agent, or Firm* — JCIPRNET

(57) ABSTRACT

A lens unit is provided capable of reducing the shift of the focal position when the temperature rises. The lens unit includes a plurality of lenses and a cylindrical holder configured to internally hold the plurality of lenses. The holder has a smaller coefficient of thermal expansion, compared to single lenses (i.e., the second lens and the third lens) that are meniscus-shaped plastic lenses. The side surfaces of the second lens and the third lens are press-fitted such that the concave side portions corresponding to the positions of the concave lens surfaces abut the inner surface of the holder, the second lens and the third lens including the concave lens surfaces and the convex lens surfaces. Therefore, when the ambient temperature rises, the refractive index of the plastic lens decreases but the convex lens surface deforms such that the curvature radius becomes smaller.

10 Claims, 7 Drawing Sheets

(56) References Cited

FOREIGN PATENT DOCUMENTS

| | | |
|---|---|---|
| JP | 2011-107425 | 6/2011 |
| JP | 2014119707 | 6/2014 |
| JP | 2015087739 | 5/2015 |
| WO | 2016199897 | 12/2016 |

\* cited by examiner

LENS UNIT

CROSS-REFERENCE TO RELATED APPLICATION

This application is a 371 application of the international PCT application serial no. PCT/JP2018/005011, filed on Feb. 14, 2018, which claims the priority benefits of Japan application no. 2017-026193, filed on Feb. 15, 2017. The entirety of each of the above-mentioned patent applications is hereby incorporated by reference herein and made a part of this specification.

TECHNICAL FIELD

The present invention relates to a lens unit with a cylindrical holder in which multiple lenses are held.

BACKGROUND ART

A lens configuration provided with multiple lenses including a meniscus lens has been proposed as a wide-angle lens (c.f., Patent Literature 1). The multiple lenses are held in a cylindrical holder.

CITATION LIST

Patent Literature

[Patent Literature 1] Japanese Unexamined Patent Publication No. 2011-107425

SUMMARY OF THE INVENTION

Problems to be Solved by the Invention

There has been a problem that, in a case where a plastic lens is employed in the lens unit disclosed in Patent Literature 1, etc., the refractive index of the plastic lens decreases when the ambient temperature rises, which causes the focal position to be shifted toward the image side.

In view of the above problem, the object of the present invention is to optimize the configuration of the meniscus-shaped plastic lens press-fitted into a holder, so as to provide a lens unit capable of reducing the shift of the focal position when the temperature rises.

Means for Solving the Problem

To solve the problem as described above, the present invention is characterized by a lens unit including: a plurality of lenses; and a cylindrical holder configured to internally hold the plurality of lenses. Further, the plurality of lenses include a first lens disposed outermost on an object side and a lens group disposed on an image side relative to the first lens. Further, the lens group includes a single lens that is a meniscus-shaped plastic lens having a concave lens surface and a convex lens surface. Further, the holder has a smaller coefficient of thermal expansion, compared to the single lens. Further, the single lens is press-fitted into the holder such that a concave side portion on a side surface of the single lens abuts an inner surface of the holder, the concave side portion corresponding to a position of the concave lens surface.

In a case where a single lens that is a meniscus-shaped plastic lens is employed in the present invention, the refractive index of the plastic lens decreases when the ambient temperature rises. However, regarding the side surface of the single lens, a concave side portion corresponding to the position of the concave lens surface abuts the inner surface of the holder. Therefore, when the ambient temperature rises, the convex lens surface of the single lens (i.e., plastic lens) receives a reaction force of the force of expansion and deforms such that the curvature radius becomes smaller. As a result, when the ambient temperature rises, decrease in the power due to decrease in the refractive index of the plastic lens is offset by increase in the power in association with deformation of the convex lens surface. Therefore, by optimizing the configuration of a meniscus lens that is a plastic lens press-fitted into a holder, it is possible to reduce the shift of the focal position at the time of temperature rise.

In the present invention, it is possible to adopt a mode in which the holder is made of resin material blended with inorganic reinforcing fiber. According to such a mode as above, it is possible to efficiently manufacture a holder having a smaller coefficient of thermal expansion, compared to a single lens that is a plastic lens.

In the present invention, it is possible to adopt a mode in which the lens group includes a plurality of single lenses including the single lens. Further, each of the plurality of single lenses is press-fitted into the holder such that the concave side portion abuts the inner surface of the holder.

In the present invention, it is possible to adopt a mode in which the lens group includes the plurality of single lenses and a cemented lens. Further, the cemented lens includes a lens that is a meniscus-shaped plastic lens having a concave lens surface and a convex lens surface. Further, the lens is press-fitted into the holder such that a concave side portion of a side surface of the lens abuts the inner surface of the holder, the concave side portion corresponding to a position of the concave lens surface, the lens including the concave lens surface and the convex lens surface.

In the present invention, it is possible to adopt a mode in which the lens group includes a second lens, a third lens, a fourth lens, and a fifth lens, which are disposed in order from an object side to an image side. Further, each of the second lens and the third lens has a configuration as one of the plurality of lenses. Further, the fourth lens and the fifth lens configure the cemented lens.

In the present invention, it is possible to adopt a mode in which an annular stepped part protruding inward in a radial direction is formed on an inner circumferential surface of the holder. Further, positions in the lens group are determined in an optical axis direction with the stepped art as a basis.

In the present invention, it is possible to adopt a mode in which the concave lens surface and the convex lens surface of the single lens are coated by a coating layer. Further, a plurality of ribs are formed at a plurality of positions on an inner circumferential surface of the holder, the plurality of ribs extending in the optical axis direction. According to such a mode as above, it is possible to reduce deformation of the lens surface at the time of temperature rise into an optimized level. Therefore, it is unlikely that a problem such as cracking or peeling of a coating layer occurs.

Effect of the Invention

In a case where a single lens that is a meniscus-shaped plastic lens is employed in the present invention, the refractive index of the plastic lens decreases when the ambient temperature rises. However, regarding the side surface of the single lens, a concave side portion corresponding to the position of the concave lens surface abuts the inner surface of the holder. Therefore, when the ambient temperature rises, the convex lens surface of the single lens (i.e., plastic lens) receives a reaction force of the force of expansion and deforms such that the curvature radius becomes smaller. As a result, when the ambient temperature rises, decrease in the power due to decrease in the refractive index of the plastic lens is offset by increase in the power in association with deformation of the convex lens surface. Therefore, by optimizing the configuration of a meniscus lens that is a plastic lens press-fitted into a holder, it is possible to reduce the shift of the focal position at the time of temperature rise.

DESCRIPTION OF EMBODIMENTS (Configuration of Wide-Angle Lens 100)

Figure 1:
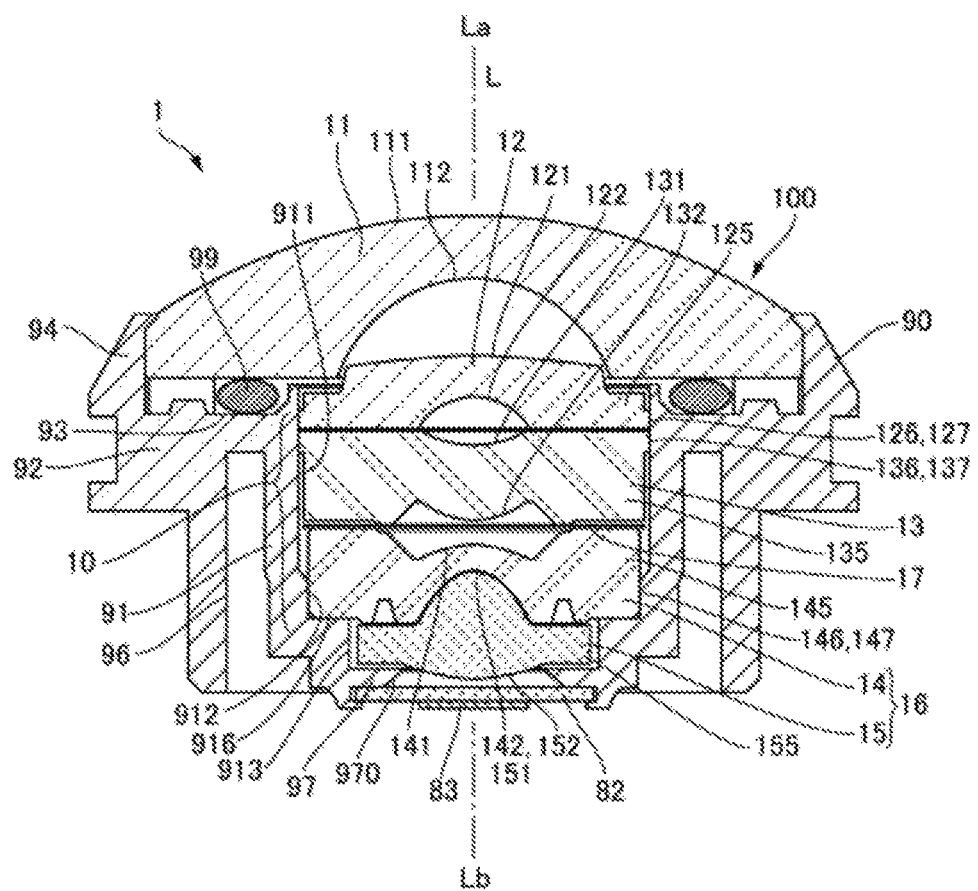
FIG. 1 is a cross-sectional view of a lens unit to which the present invention is applied.

FIG. 1 is a cross-sectional view of a lens unit 1 to which the present invention is applied. As illustrated in FIG. 1, the lens unit 1 of the present embodiment includes: a wide-angle lens 100 provided with multiple lenses; and a cylindrical holder 90 internally holding the wide-angle lens 100. Regarding the wide-angle lens 100, the multiple lenses includes: a first lens 11 disposed outermost on the object side La; and a lens group 10 disposed on the image side Lb relative to the first lens 11. The lens group 10 includes a single lens that is a meniscus-shaped plastic lens having a concave lens surface and a convex lens surface. Furthermore, the lens group 10 includes a cemented lens.

More specifically, the wide-angle lens 100 includes the first lens 11, the second lens 12, the third lens 13, a diaphragm 17, the fourth lens 14, and the fifth lens 15, which are disposed in order from the object side La to the image side Lb. The first lens 11 is a negative meniscus lens whose convex surface faces the object side La. In the present embodiment, both of the lens surface 111 on the object side, which is the convex surface of the first lens 11, and the lens surface 112 on the image side Lb, which is the concave surface of the first lens 11, are spherical.

The second lens 12 is a negative lens whose concave surface faces the image side Lb. In the present embodiment, regarding the second lens 12, at least one of the lens surface 121 on the object side La, which is the convex surface, and the lens surface 122 on the image side Lb, which is the concave surface, is aspherical. In the present embodiment, both of the lens surface 121 of the second lens 12 on the object side La and the lens surface 122 of the second lens 12 on the image side Lb are aspherical.

The third lens 13 is a positive meniscus lens whose convex surface faces the image side Lb. In the present embodiment, regarding the third lens 13, at least one of the lens surface 131 on the object side La, which is the concave surface, and the lens surface 132 on the image side Lb, which is the convex surface, is aspherical. In the present embodiment, regarding the third lens 13, both of the lens surface 131 on the object side La, which is the concave surface, and the lens surface 132 on the image side Lb, which is the convex surface, are aspherical.

The fourth lens 14 is a negative meniscus lens whose concave surface faces the image side Lb. In the present embodiment, regarding the fourth lens 14, both of the lens surface 141 on the object side La, which is the convex surface, and the lens surface 142 on the image side Lb, which is the concave surface, are aspherical.

The fifth lens 15 is a biconvex lens. Further, the lens surface 151 of the fifth lens 15 on the object side La is cemented to the lens surface 142 of the fourth lens 14 on the image side Lb, so as to form a cemented lens 16. Regarding the fifth lens 15, both of the lens surface 151 on the object side La, which is the convex surface, and the lens surface 152 on the image side Lb, which is the convex surface, are aspherical.

The first lens 10 is a glass lens. Further, the second lens 12, the third lens 13, the fourth lens 14, and the fifth lens 15 are plastic lenses. Accordingly, the second lens 12, the third lens 13, the fourth lens 14, and the fifth lens 15 have flange parts 125, 135, 145, and 155 formed on the outer sides of respective lens surfaces in the radial direction.

With respect to the wide-angle lens 100 with such a configuration as above, the effective focal length f0 of the entire optical system is 1.056 mm; the object-to-image distance is 11.794 mm; the F-number of the entire lens system is 2.0; the maximum angle of view is 193 deg; and the horizontal angle of view is 193 deg.

(Configuration of Holder 90, Etc.)

The holder 90 is made of resin, metal, or the like, that is, material having a smaller coefficient of thermal expansion, compared to the plastic lenses (i.e., the second lens 12, the third lens 13, the fourth lens 14, and the fifth lens 15). For example, the coefficient of linear expansion of the lens material used for the plastic lenses is $60^{-6}/°$ C. to $70 \times 10^{-6}/°$ C. Therefore, for the holder 90, metal such as aluminum (coefficient of linear expansion: $23 \times 10^{-6}/°$ C.) or brass (coefficient of linear expansion: $19 \times 10^{-6}/°$ C.) or resin material such as polycarbonate (linear expansion coefficient: $50^{-6}/°$ C.) is used. Additionally, resin material filled with inorganic reinforcing fiber such as glass fiber may be used for the holder 90. In this case, resin material filled with inorganic reinforcing fiber such as glass fiber may be used for the holder 90. In this case, the coefficient of thermal expansion of the holder 90 is even smaller, compared to the plastic lenses. Therefore, by using the resin material filled with the inorganic reinforcing fiber, it is possible to efficiently manufacture a holder 90 having a small coefficient of thermal expansion.

The holder 90 includes: a bottom plate part 97 positioned outermost on the rear side in an optical axis L direction; a cylindrical body part 91 extending from the outer peripheral edge of the bottom plate part 97 toward the front side (i.e., object side La); an annular receiving part 92 extending outward in the radial direction from the front edge of the cylindrical body part 91; a cylindrical part 94 having a large diameter whose inside diameter is larger than the cylindrical body part 91 and extending toward the front side (i.e., object side La) from the outer peripheral edge of the receiving part 92. The bottom plate part 97 of the holder 90 has an opening part 970. An infrared filter 82 is held on the surface of the bottom plate part 97 on the image side Lb. Further, an imaging element 83 is disposed on the image side Lb of the infrared filter 82.

Inside the cylindrical body part 91 of the holder 90, a first housing part 911, a second housing part 912 whose inside diameter is smaller than that of the first housing part 911, and a third housing part 913 whose inside diameter is smaller than that of the second housing part 912 are formed in order from the object side La to the image side Lb. Corresponding to such a configuration as above, the cylindrical body part 91 has a recessed part 96, which is recessed from the image side Lb toward the object side La and formed in an annular shape. Furthermore, on the inner circumferential surface of the recessed part 96, there are formed stepped parts for reducing the difference in wall thicknesses of the first housing part 911, the second housing part 912, and the third housing part 913. Therefore, at a time of manufacturing the holder 90 by means of resin molding, it is possible to reduce deterioration in dimensional accuracy due to sink marks of resin.

In the present embodiment, regarding the cemented lens 16, the outside diameter of the fourth lens 14 is larger than the outside diameter of the fifth lens 15. Therefore, the portion of the fourth lens 14 extending toward the outer side of the fifth lens 15 in the radial direction abuts the stepped part 916 protruding toward the inner side in the radial direction between the second housing part 912 and the third housing part 913. Furthermore, inside the cylindrical body part 91, the diaphragm 17, the third lens 13, and the second lens 12 are stacked in order and disposed on the object side La relative to the cemented lens 16. Accordingly, the positions in the lens group 10 are determined in the direction of the optical axis L with the stepped part 916 as the basis.

The outside diameter of the first lens 11 is larger than the inside diameter of the cylindrical body part 91. Further, the first lens 11 is disposed so as to abut the receiving part 92 inside the cylindrical part 94. Between the first lens 11 and the receiving part 92, an O-ring 99 is disposed in the annular groove 93 formed in the receiving part 92. Here, the end of the cylindrical part 94 on the object side La is caulked so that the first lens 11 is fixed.

(Configuration Press-fitted into Holder 90)

Figure 2:
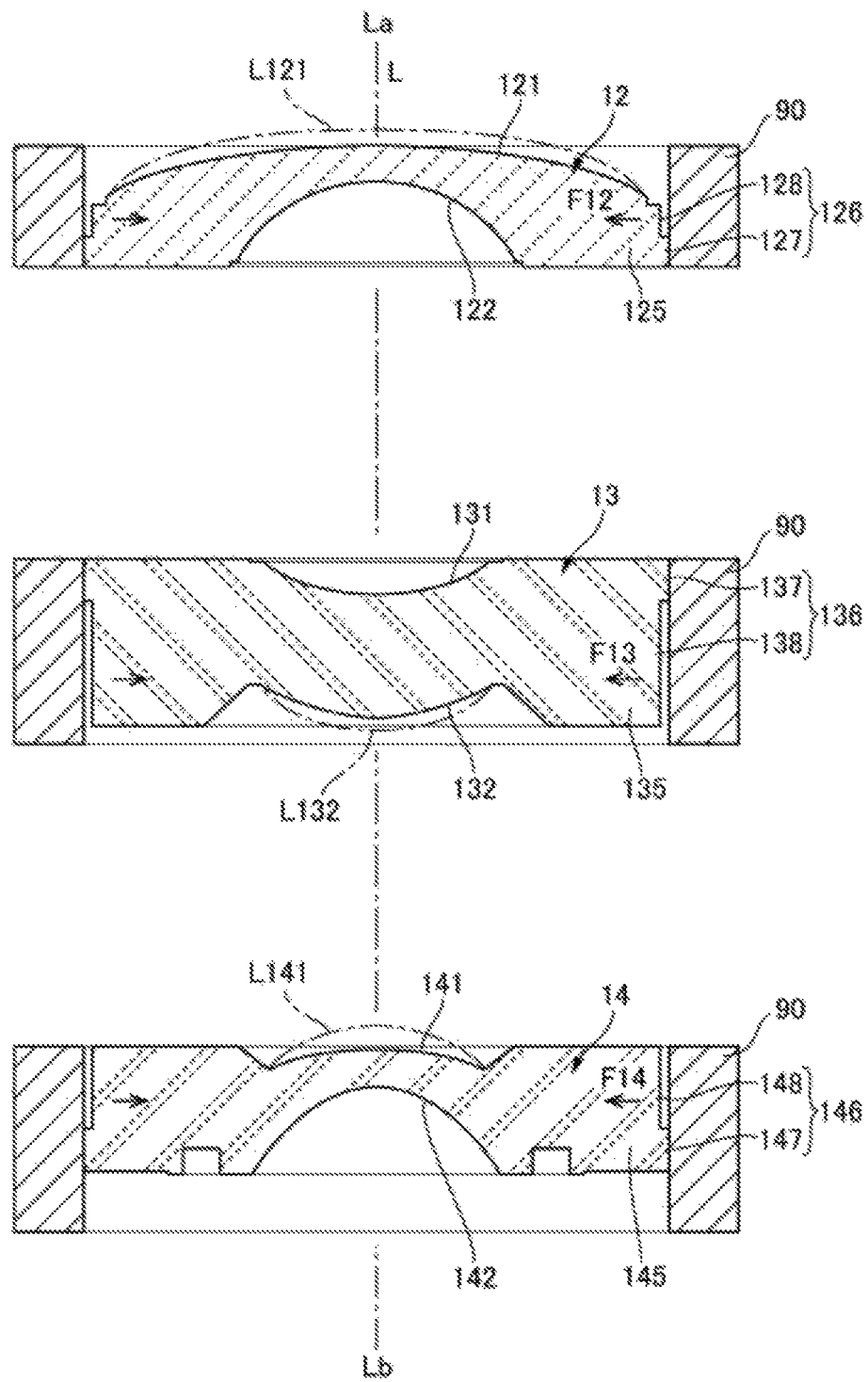
FIG. 2 is an explanatory diagram illustrating a configuration of lenses press-fitted into a holder of the lens unit to which the present invention is applied.

FIG. 2 is an explanatory diagram illustrating a configuration of lenses press-fitted into the holder 90 of the lens unit 1 to which the present invention is applied. Regarding the lens unit 1 illustrated in FIG. 1, the lens group 10 is press-fitted into the holder 90 such that the lens group 10 is fixed. As a result, the side surface 126 of the flange part 125 of the second lens 12 abuts the inner circumferential surface of the holder 90. Further, the side surface 136 of the flange part 135 of the third lens 13 abuts the inner circumferential surface of the holder 90. Further, the side surface 146 of the flange part 145 of the fourth lens 14 abuts the inner circumferential surface of the holder 90.

In the present embodiment, each of the second lens 12 and the third lens 13 is configured to be a single lens that is a meniscus-shaped plastic lens. Therefore, regarding the side surface of such a single lens, a concave side portion, which corresponds to the position of a concave lens surface, is arranged to abut the inner surface of the holder 90.

More specifically, as illustrated in FIG. 2, regarding the side surface 126 of the flange part 125 of the second lens 12, the concave side portion 127, which corresponds to the position of the lens surface 122 (i.e., concave lens surface) on the image side Lb, is configured to have a larger diameter than the convex side portion 128, which corresponds to the position of the lens surface 121 (i.e., convex lens surface) on the object side La, such that the concave side portion 127 is arranged to abut the inner surface of the holder 90.

Furthermore, regarding the side surface 136 of the flange part 135 of the third lens 13, the concave side portion 137, which corresponds to the position of the lens surface 131 (i.e., concave lens surface) on the object side La, is configured to have a larger diameter than the convex side portion 138, which corresponds to the position of the lens surface 132 (i.e., convex lens surface) on the image side Lb, such that the concave side portion 137 is arranged to abut the inner surface of the holder 90.

Furthermore, in the present invention, the fourth lens 14 used for the cemented lens 16 is a meniscus-shaped plastic lens as well. Therefore, regarding the side surface 146 of the flange part 145, the concave side portion 147, which corresponds to the position of the lens surface 142 (i.e., concave lens surface) on the image side Lb, is configured to have a larger diameter than the convex side portion 148, which corresponds to the position of the lens surface 141 (i.e., concave lens surface) on the object side La, such that the concave side portion 147 is arranged to abut the inner surface of the holder 90.

(Function and Effect)

With reference to FIGS. 3, 4, 5, and 6, the temperature characteristics of the lens unit 1 to which the present invention is applied is explained in comparison with the temperature characteristics of a lens unit according to a comparative example.

Figure 3:
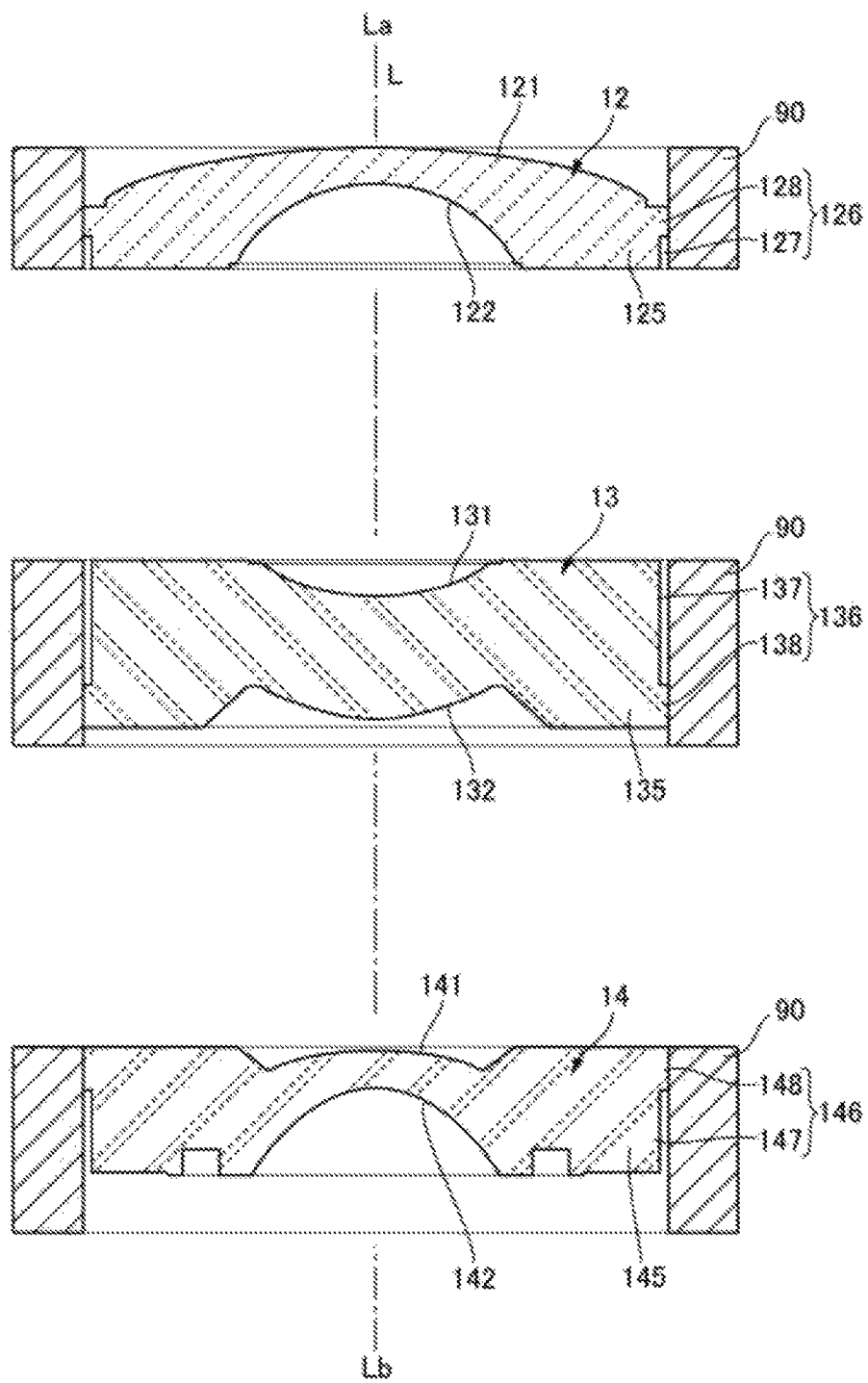
FIG. 3 is an explanatory diagram illustrating a configuration of lenses press-fitted into a holder of a lens unit according to a comparative example relative to the present invention.
Figure 4:
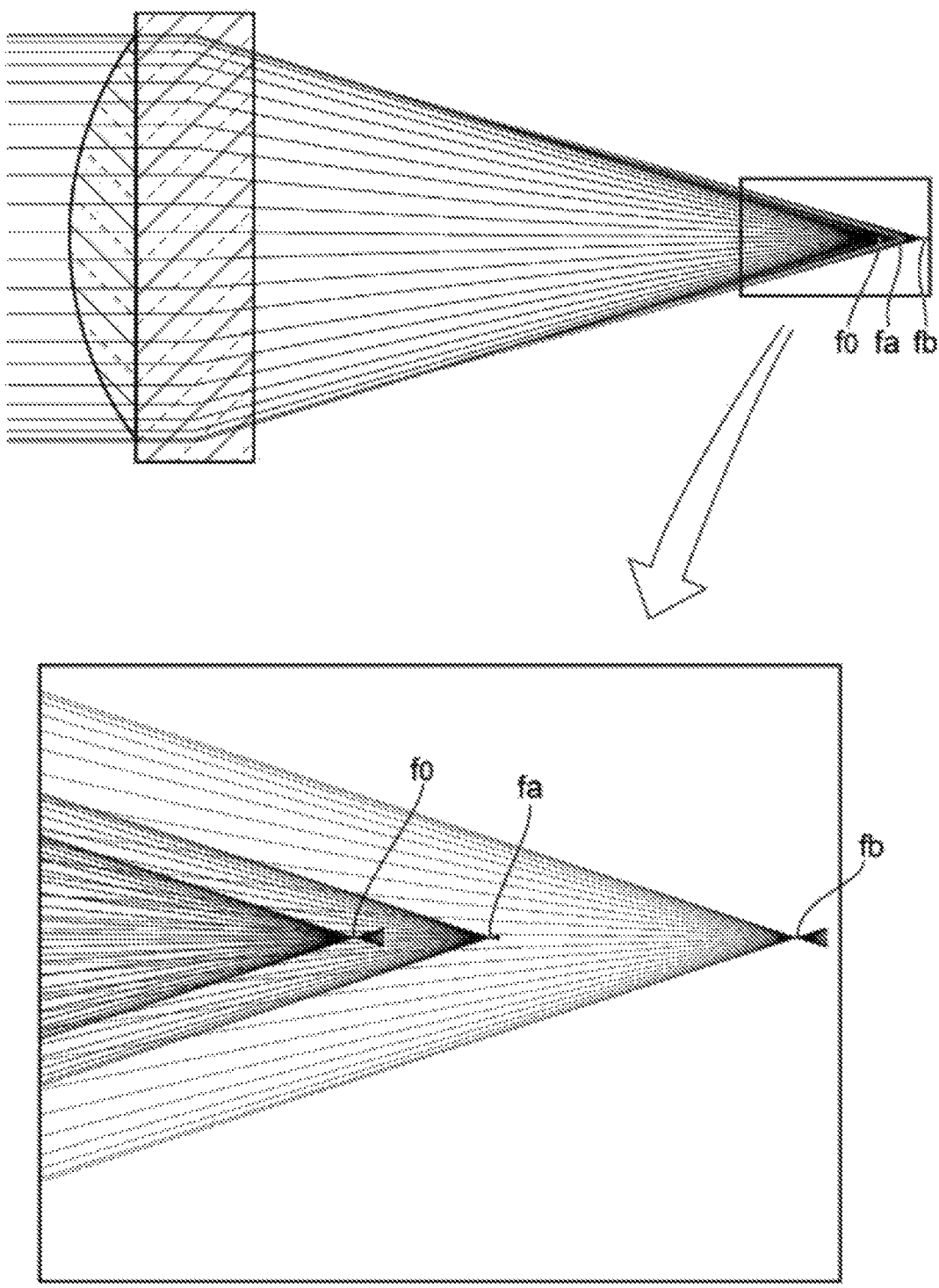
FIG. 4 is an explanatory diagram schematically illustrating a shift amount of the focal position at the temperature of 85° C. regarding the lens unit to which the present invention is applied.
Figure 5:
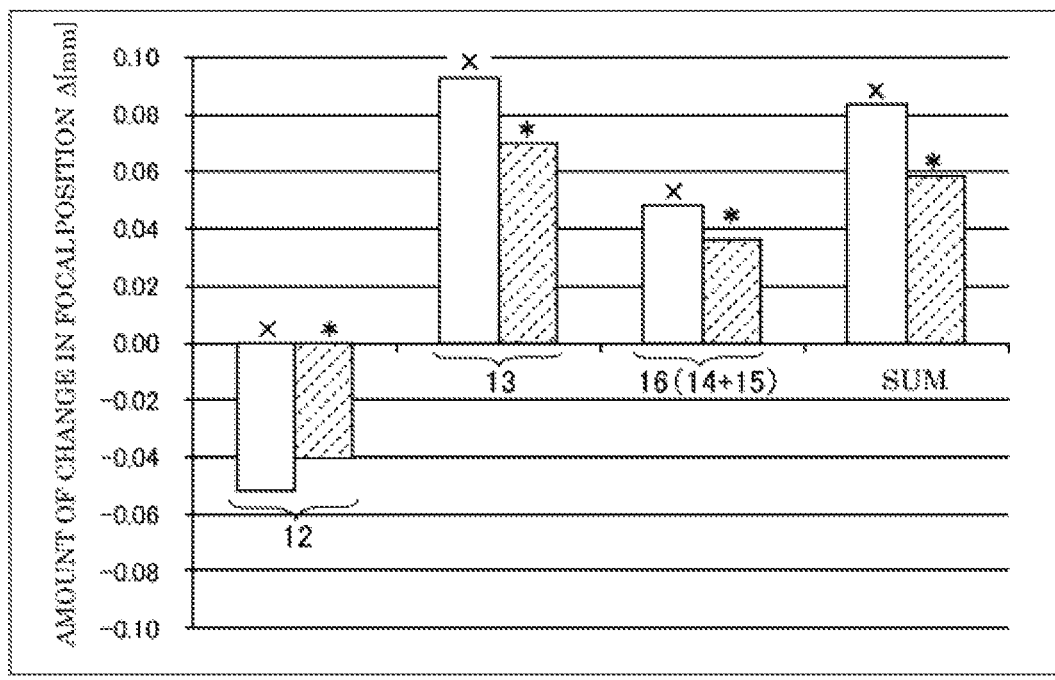
FIG. 5 is an explanatory diagram schematically illustrating a shift amount of the focal position at the temperature of 85° C. regarding each lens of the lens unit to which the present invention is applied.
Figure 6:
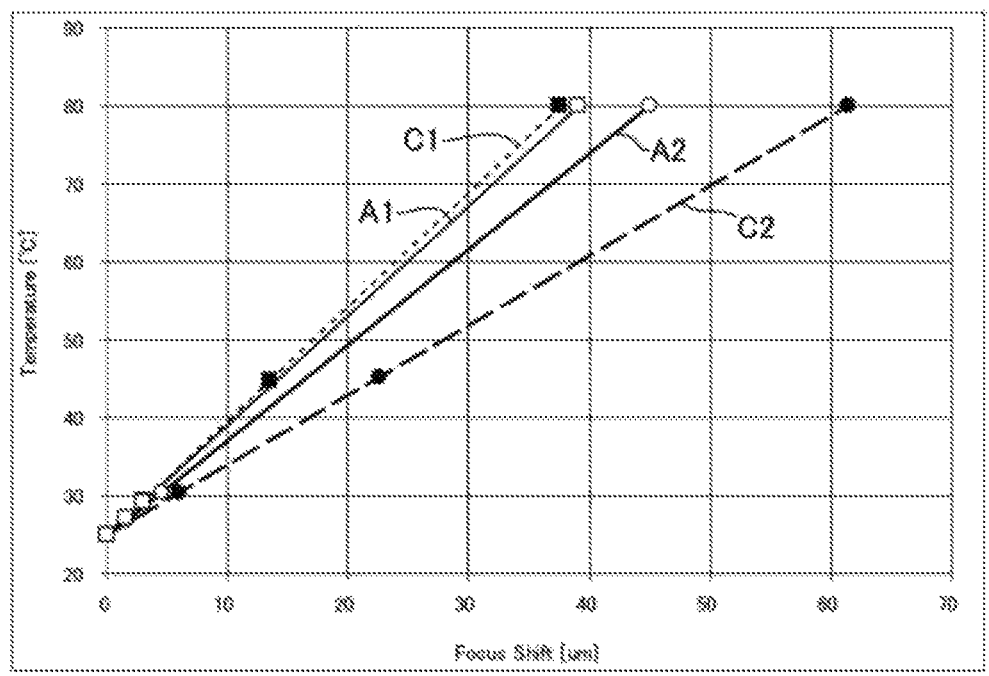
FIG. 6 is an explanatory diagram illustrating shift amounts of the focal position at different temperatures regarding the lens unit to which the present invention is applied.

FIG. 3 is an explanatory diagram illustrating a configuration of lenses press-fitted into a holder 90 of a lens unit according to a comparative example relative to the present invention. FIG. 3 is an explanatory diagram corresponding to FIG. 2. FIG. 4 is an explanatory diagram schematically illustrating a shift amount of the focal position at the temperature of 85° C. regarding the lens unit 1 to which the present invention is applied. FIG. 5 is an explanatory diagram schematically illustrating a shift amount of the focal position at the temperature of 85° C. regarding each lens of the lens unit 1 to which the present invention is applied. FIG. 6 is an explanatory diagram illustrating shift amounts of the focal position at different temperatures regarding the lens unit 1 to which the present invention is applied.

Note that, in the explanation of the comparative example illustrated in FIG. 3, the same reference signs are assigned to the parts corresponding to the configuration illustrated in FIG. 2. In FIG. 5, the characteristics of the lens unit 1 to which the present invention is applied are indicated by the graphs to which a * mark is assigned, and the characteristics of the lens unit according to the comparative example are indicated by the graphs to which an x mark is assigned. In FIG. 6, the characteristic in the case where the lens unit according to the present invention is configured with an aluminum holder 90 is indicated by the solid line A1, and the characteristic of the comparative example is indicated by the solid line A2. Furthermore, in FIG. 6, the characteristic in the case where the lens unit according to the present invention is configured with an polycarbonate holder 90 is indicated by the broken line C1, and the characteristic of the comparative example is indicated by the broken line C2.

As illustrated in FIG. 3, in the lens unit according to the comparative example relative to the present invention, regarding the side surface 126 of the flange part 125 of the second lens 12, the concave side portion 127, which corresponds to the position of the lens surface 122 (i.e., concave lens surface) on the image side Lb, is configured to have a smaller diameter than the convex side portion 128, which corresponds to the position of the lens surface 121 (i.e., convex lens surface) on the object side La, such that the convex side portion 128 is arranged to abut the inner surface of the holder 90. Regarding the side surface 136 of the flange part 135 of the third lens 13, the concave side portion 137, which corresponds to the position of the lens surface 131 (i.e., concave lens surface) on the object side La, is configured to have a smaller diameter than the convex side portion 138, which corresponds to the position of the lens surface 132 (i.e., convex lens surface) on the image side Lb, such that the convex side portion 138 is arranged to abut the inner surface of the holder 90. Regarding the side surface 146 of the flange part 145 of the fourth lens 14 used for the cemented lens 16, the concave side portion 147, which corresponds to the position of the lens surface 142 (i.e., concave lens surface) on the image side Lb, is configured to have a smaller diameter than the convex side portion 148, which corresponds to the position of the lens surface 141 (i.e., convex lens surface) on the object side La, such that the convex side portion 148 is arranged to abut the inner surface of the holder 90.

Regarding the lens unit according to the comparative example of the present invention, as the ambient temperature rises, the refractive index of the plastic lenses decreases. Therefore, as illustrated in FIG. 4, the focal position is largely shifted from the position f0 to the position fb. Such reduction in the refractive index of the plastic lenses occur in the lens unit 1 to which the present invention is applied as well. However, regarding the lens unit 1 to which the present invention is applied, as explained with reference to FIG. 2, the meniscus-shaped plastic lenses (i.e., the second lens 12, the third lens 13, and the fourth lens 14) abut the inner surface of the holder 90 with the concave side portions 127, 137, and 147. Furthermore, the holder 90 has a smaller coefficient of thermal expansion, compared to the plastic lenses. Therefore, when the ambient temperature rises, each of the meniscus-shaped plastic lenses (i.e., the second lens 12, the third lens 13, and the fourth lens 14) receives a reaction force (i.e, the arrows F12, F13, or F14 illustrated in FIG. 2) of the force of expansion and deforms such that the curvature radius of a convex lens surface becomes smaller, as indicated by the dashed-dotted line L121, L132, or L141 in FIG. 2. As a result, when the ambient temperature rises, decrease in the power due to decrease in the refractive index of a plastic lens is offset by increase in the power in association with deformation of a convex lens surface. Therefore, it is possible to reduce the shift of the focal position at the time of temperature rise of the meniscus lenses, which are plastic lenses, to the position fa as illustrated in FIG. 4. Contrarily, regarding the lens unit according to the comparative example of the present invention, the above-described deformation does not occur. Note that the purpose of the dashed-dotted lines L121, L132, and L141 illustrated in FIG. 2 is to explain deformation of the curvature radius of the convex lens surfaces, and actual deformation is smaller than the deformation as indicated by the dashed-dotted lines L121, L132, and L141, that is, approximately several μm to ten and several μm.

Accordingly, the shift of the focal position of each lens in a case where the ambient temperature is changed from the room temperature to 85° C. results in as illustrated in FIG. 5. That is, regarding the lens unit 1 to which the present invention is applied, the shift amount (i.e, AMOUNT OF CHANGE IN FOCAL POSITION) of the focal position of each lens is smaller than the lens unit according to the comparative example. Therefore, regarding the lens unit 1 to which the present invention is applied, the shift amount of the focal position of the entire lens system (i.e., SUM) is smaller than the lens unit according to the comparative example.

Furthermore, as illustrated in FIG. 6, regarding the lens unit 1 to which the present invention is applied, even in the case of using a holder 90 made of aluminum or polycarbonate, the shift amount (i.e, AMOUNT OF CHANGE IN FOCAL POSITION) of the focal position of each lens is smaller than the lens unit according to the comparative example.

(Improved Example of Holder 90)

Figure 7:
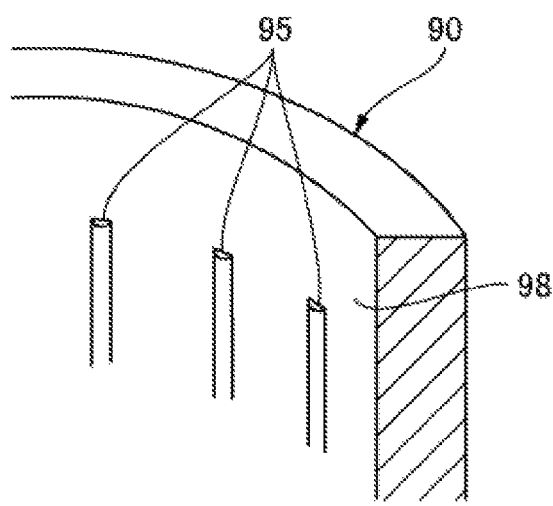
FIG. 7 is an explanatory diagram illustrating an improved example of the holder used for the lens unit to which the present invention is applied.

FIG. 7 is an explanatory diagram illustrating an improved example of the holder 90 used for the lens unit 1 to which the present invention is applied. Regarding the lens unit 1 explained with reference to FIG. 1 and FIG. 2, a coating layer such as an antireflection film may be formed on the lens surfaces 121 and 122 of the second lens 12, the lens surfaces 131 and 132 of the third lens 13, and the lens surface 141 of the fourth lens 14, etc. In this case, there is a possibility that cracking, peeling or the like may occur in the coating layer when the lens surfaces are greatly deformed. Therefore, as illustrated in FIG. 7, multiple ribs 95 extending in the direction of the optical axis L may be formed at multiple positions in the circumferential direction on the inner circumferential surface 98 of the holder 90, so that the reaction force indicated by the arrows F12, F13, and F14 in FIG. 2 are reduced to keep deformation of lens surfaces small.

[Other Embodiments]

Although the case of a configuration with five lenses in four groups is taken as an example in the embodiment described above, the present invention may be applied to a case in which another lens configuration is adopted.

The invention claimed is:

1. A lens unit, comprising:
a plurality of lenses; and
a cylindrical holder, configured to internally hold the plurality of lenses,
wherein
the plurality of lenses include: a first lens disposed outermost on an object side, and a lens group disposed on an image side relative to the first lens,
the lens group includes a single lens that is a meniscus-shaped plastic lens having a concave lens surface and a convex lens surface,
the holder has a smaller coefficient of thermal expansion, compared to the single lens, and
the single lens is press-fitted into the holder such that a concave side portion on a side surface of the single lens abuts an inner surface of the holder, the concave side portion corresponding to a position of the concave lens surface.

2. The lens unit according to claim 1, wherein
the holder is made of a resin material blended with an inorganic reinforcing fiber.

3. The lens unit according to claim 2, wherein
the lens group includes a plurality of single lenses, and
each of the plurality of single lenses is press-fitted into the holder such that the concave side portion abuts the inner surface of the holder.

4. The lens unit according to claim 3, wherein
the lens group includes the plurality of single lenses and a cemented lens,
the cemented lens includes a lens that is a meniscus-shaped plastic lens having a concave lens surface and a convex lens surface, and
the lens is press-fitted into the holder such that a concave side portion of a side surface of the lens abuts the inner surface of the holder, the concave side portion corresponding to a position of the concave lens surface, the lens including the concave lens surface and the convex lens surface.

5. The lens unit according to claim 4, wherein
the lens group includes a second lens, a third lens, a fourth lens, and a fifth lens, which are disposed in order from the object side to the image side,
the second lens and the third lens are configured as the single lens, and
the fourth lens and the fifth lens configure the cemented lens.

6. The lens unit according to claim 1, wherein
a stepped part with an annular shape protruding inward in a radial direction is formed on an inner circumferential surface of the holder, and
positions in the lens group are determined in an optical axis direction with the stepped art as a basis.

7. The lens unit according to claim 1, wherein
the concave lens surface and the convex lens surface of the single lens are coated by a coating layer, and
a plurality of ribs is formed at a plurality of positions on an inner circumferential surface of the holder, the plurality of ribs extending in the optical axis direction.

8. The lens unit according to claim 1, wherein
the lens group includes a plurality of single lenses, and
each of the plurality of single lenses is press-fitted into the holder such that the concave side portion abuts the inner surface of the holder.

9. The lens unit according to claim 8, wherein
the lens group includes the plurality of single lenses and a cemented lens,
the cemented lens includes a lens that is a meniscus-shaped plastic lens having a concave lens surface and a convex lens surface, and
the lens is press-fitted into the holder such that a concave side portion of a side surface of the lens abuts the inner surface of the holder, the concave side portion corresponding to a position of the concave lens surface, the lens including the concave lens surface and the convex lens surface.

10. The lens unit according to claim 9, wherein
the lens group includes a second lens, a third lens, a fourth lens, and a fifth lens, which are disposed in order from the object side to the image side,
the second lens and the third lens are configured as the single lens, and
the fourth lens and the fifth lens configure the cemented lens.

* * * * *